July 10, 1962  J. DEMETER ET AL  3,043,738
APPLYING THERMOSETTING RESIN TO POROUS
SUPPORT BY USING VACUUM
Filed Aug. 28, 1958

INVENTORS
JÓZSEF DEMETER & JENŐ SZABADY
BY Irwin S. Thompson
ATTY.

3,043,738
APPLYING THERMOSETTING RESIN TO POROUS SUPPORT BY USING VACUUM
József Demeter and Jenö Szabady, Budapest, Hungary
Filed Aug. 28, 1958, Ser. No. 757,866
Claims priority, application Hungary Sept. 6, 1957
7 Claims. (Cl. 156—229)

In the production of laminated articles, such as laminated phenoplasts, from a thermosetting polycondensation synthetic resin the starting material generally used is a sheetlike support coated or impregnated with the synthetic resin. In order to carry out such coating or impregnation the synthetic resin has to be dissolved in a solvent, mostly alcohol, and the lacquer thus obtained has to be applied to the support by spreading or impregnation. Subsequent to said application the lacquered or impregnated resin support has to run through a drying tunnel with the object of evaporating the solvent. This lacquering or impregnating method requires bulky, expensive apparatus with a high power consumption. Another defect of this method consists in that a further expensive apparatus is required for the recuperation of 80 to 85% at most of the solvent.

The method and apparatus according to the present invention will eliminate said inconveniences by doing away with the application of any solvent. In exceptional cases, however, at most 10% of a solvent is used, whereas with the old method said quantity amounted to 100% on the average, calculated in relation to the bulk of the synthetic resin.

According to the invention the process for applying a layer of thermosetting resin capable of being heat-hardened on a carrier support comprises the steps of applying in a uniform manner and at a predetermined speed a layer of resin lying between the softening and drip point onto one surface of the support which advances at a predetermined speed and is preheated, applying a vacuum on the surface of the support opposite the layer of resin to effect better adherence of the portion of resin in contact with the support, applying heat above the melting point of the resin to lower the viscosity thereof for absorption into the support, maintaining the latter heat until detrimental gases and condensation by-products are eliminated from the resin, and then cooling the absorbed resin.

The invention is based on the recognition that in the soluble condition, in the so-called phase A, in which the thermosetting polycondensation synthetic resins may be, according to their condensation grade, quite hard and brittle as glass at room temperature, there may be found a temperature interval above their softening point within which the synthetic resin has excellent foil-forming properties. This interval lies, for most synthetic resins, not far above the softening point, i.e., at a temperature so low that the speed of the reaction of condensation is low. Hence, without essentially modifying, i.e., increasing, the condensation temperature there is sufficient time for preparing a foil of the prescribed thinness from the synthetic resin by means of a suitable device, and to lay it upon the heated sheetlike support while maintaining the said temperature, or to make it adhere to the support by pressure which may be produced by means of vacuum acting on the side of the support opposite to the resin layer, after which the whole is cooled down. When using a thermosetting synthetic resin, the foil-forming properties of which appear at a high temperature where the reaction speed of the condensation is already high, 1 to 10% solvent is incorporated in the resin, according to the requirements, whereby the temperature of the resin suitable for the foil-forming falls in the necessary measure.

The resin layer thus applied and adhering to the support may be, as required, either left on the surface of the support or introduced into the support in a subsequent step, in which case the support is impregnated with the resin. In this event not cooling but rapid heating is employed subsequent to sticking the resin layer to the support. Owing to such rapid heating, the temperature of which depends on the quality of the resin, the latter melts down and its viscosity falls to such a degree that the resin is absorbed into the support. This absorption may be promoted by simultaneous application of pressure by using vacuum acting on the side of the support opposite to the resin layer, or said absorption may be set to the desired degree by said pressure. The support coated with the resin is then cooled down by natural or artificial cooling methods.

The heating of the support coated with the synthetic resin to said high temperature can be used by suitable setting of the period from heating to cooling to push forward to the desired degree the condensation reaction in the resin applied to the support, for instance, as far as the limit of the so-called phase B (rubber-like state), whereby detrimental gases and condensation byproducts are to the most possible degree eliminated from the resin.

The apparatus to carry out the method according to the invention is exemplified in the drawing.

Figure 1:
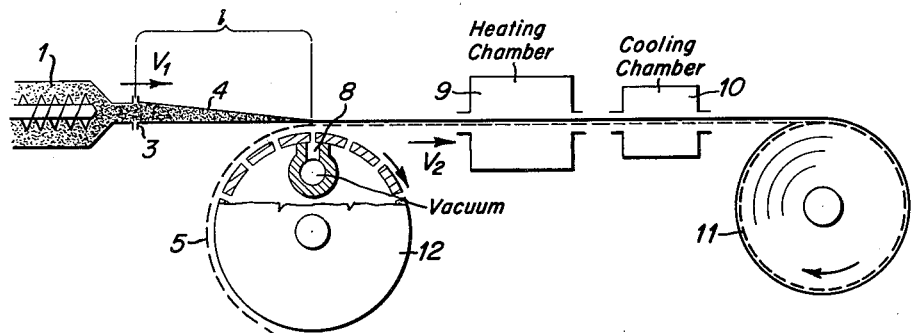
FIG. 1 is a schematic view of one embodiment of the apparatus where the support lies on a rotatable heated cylinder.

The thermosetting synthetic resin to be applied to the support is supplied to a device adapted to produce the foil, such as an extruder 1 heated to a temperature within the interval adapted to form a foil from the resin employed. Said extruder 1 is provided with a foil-drawing head 2. The resin layer 4 of a few tenths of a millimeter thickness emerging with a constant velocity $V_1$ from the extruder lies upon a support band 5 accordingly preheated, passing with a speed $V_2$ in front of the extruder. The orifice 3 of the extruder head and the surface of the support do not contact, but in the space between them the resin layer emerging from the orifice is stretched and thereby thinned. By adjusting the orifice of the extruder and thus the thickness of the resin layer discharged from the extruder, the thickness of the resin layer applied to the support is coarsely adjusted, whereas by modifying the difference between the speeds $V_1$ and $V_2$ fine adjustment of said layer thickness may be achieved.

The temperature of the extruder 1 must be adjusted to a value falling into the foil-forming range, and at which the resin has the most favorable foil-forming properties, when a certain width of orifice, foil thickness and support speed is used.

Figure 2:
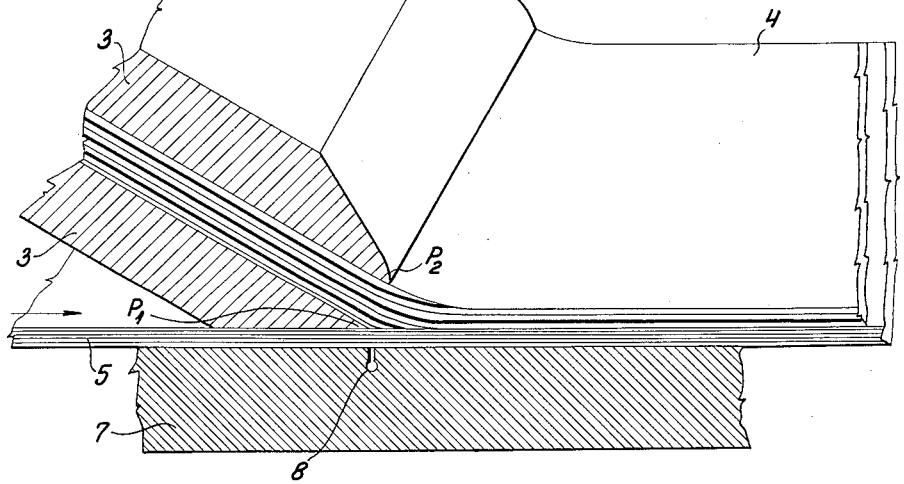
FIG. 2 illustrates another relative arrangement of the extruder orifice and the support which here lies on a heated table.
Figure 3:
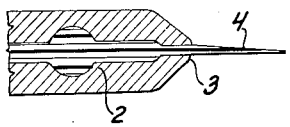
FIG. 3 is an enlarged view of the foil drawing head and the drawing orifice.

The distance 1 between the orifice 3 and the support 5 may be made adjustable and, if need be, reduced to such a degree that the support 5 contacts with an edge of the orifice 3, see FIG. 2, $P_1$. In this event stretching is combined with spreading on, with the advantage that no air enters between the support in contact with the edge $P_1$ and the resin layer emerging at the edge $P_1$, and the resin layer thus adheres better to the support. The stretching then takes place in the region laying immediately after the edge $P_2$ of the orifice, but only in the upper layer of the resin. The lowest lamina lying immediately on the support and spread on by the edge $P_1$ does not stretch.

Good adhesion of the resin to the support may be attained by applying vacuum to the side of the support opposite to the resin layer where the latter comes first into contact with the support. This can be done according to FIG. 2, where the support is guided on a heatable table 7 having a channel 8 under vacuum parallel to the edge $P_1$. Like channels may be made on the surface of cylinder 12 according to FIG. 1, in which case the channel just turning under the contact spot of the resin with the support is placed under vacuum. A sliding joint piece serves this purpose, which is arranged below said contact spot.

Good adhesion of the resin layer to the support may furthermore be attained by using a couple of cooled cylinders pressing the resin to the support on the spot where they are in contact.

The resin layer should be stuck to the support at a temperature within, or lower than, the foil-forming range of temperature. The resin layer thus applied remains on the surface of the support. Should the resin be introduced from the surface into the interior of the support, i.e., absorbed by the latter, one has therefor the following possibilities. From cylinder 12 of FIG. 1 the support coated with the resin is led into a heating chamber 9 of high temperature, or to a transport cylinder of high temperature disposed at a suitable place, or upon a table. By the coordination of length and temperature of the apparatus and of the speed of advance of the support the condensation of the resin may be, in addition to the impregnation, pushed forward to the most preferable degree. The impregnation may be assisted by applying vacuum to the resin layer through the support simultaneously with the heating to high temperature. This may be done similarly as described with reference to the Table 7 of FIG. 2.

The impregnated support is cooled down by natural or artificial cooling in the chamber 10 of FIG. 1 and passes then to a receiving cylinder 11.

What we claim is:

1. The process for applying a layer of thermosetting resin capable of being heat hardened on a carrier support which comprises the steps of applying in a uniform manner and at a predetermined speed a layer of resin lying between the softening and drip point onto one surface of the support which advances at a predetermined speed and is preheated, applying a vacuum on the surface of the support opposite the layer of resin to effect better adherence of the portion of resin in contact with the support, applying heat above the melting point of the resin to lower the viscosity thereof for absorption into the support, maintaining the latter heat until detrimental gases and condensation byproducts are eliminated from the resin, and then cooling the absorbed resin.

2. Process according to claim 1 in which the upper part of the resin layer is stretched while the lower part adheres to the support.

3. Process according to claim 1 in which the thickness of the resin layer can be adjusted by controlling the speed of the application of the resin layer relative to the speed of the carrier support.

4. The process for applying a layer of thermosetting resin capable of being heat hardened on a carrier support which comprises the steps of applying in a uniform manner and at a predetermined speed a layer of resin lying between the softening and drip point onto one surface of the support which advances at a predetermined speed and is preheated, applying a vacuum on the surface of the support opposite the layer of resin to effect better adherence of the portion of resin in contact with the support while simultaneously applying heat above the melting point of the resin to lower the viscosity thereof for absorption into the support, maintaining the latter heat until detrimental gases and condensation byproducts are eliminated from the resin, and then cooling the absorbed resin.

5. Process according to claim 4 in which the resin and the support are warmed in the layer formation to a temperature from 40° to 130° C.

6. Process according to claim 4 in which, after the adhesion of the layer of resin, the temperature is raised from 130° to 200° C.

7. Apparatus for applying a continuous smooth, homogenous, layer of thermosetting plastic film to a support, comprising a preheated carrier support, means for advancing the carrier support at a predetermined speed, means to apply said layer of plastic film to said carrier support at a predetermined temperatuer and a uniform rate, vacuum means to cause said plastic to adhere to said carrier support, mens to heat the film above its melting point whereby the plastic film is absorbed into the carrier support, and means to cool the absorbed film.

References Cited in the file of this patent

UNITED STATES PATENTS

| | | |
|---|---|---|
| 2,119,162 | Hartner | May 31, 1938 |
| 2,175,125 | Mack et al. | Oct. 3, 1939 |
| 2,341,130 | Unsworth | Feb. 8, 1944 |
| 2,543,894 | Colombo | Mar. 6, 1951 |
| 2,593,553 | Francis | Apr. 22, 1952 |
| 2,660,757 | Smith et al. | Dec. 1, 1953 |
| 2,681,294 | Beguin | June 15, 1954 |
| 2,714,571 | Irion et al. | Aug. 2, 1955 |
| 2,788,051 | Tuttle | Apr. 9, 1957 |

FOREIGN PATENTS

| | | |
|---|---|---|
| 728,203 | Great Britain | Apr. 13, 1955 |